Figure 1:
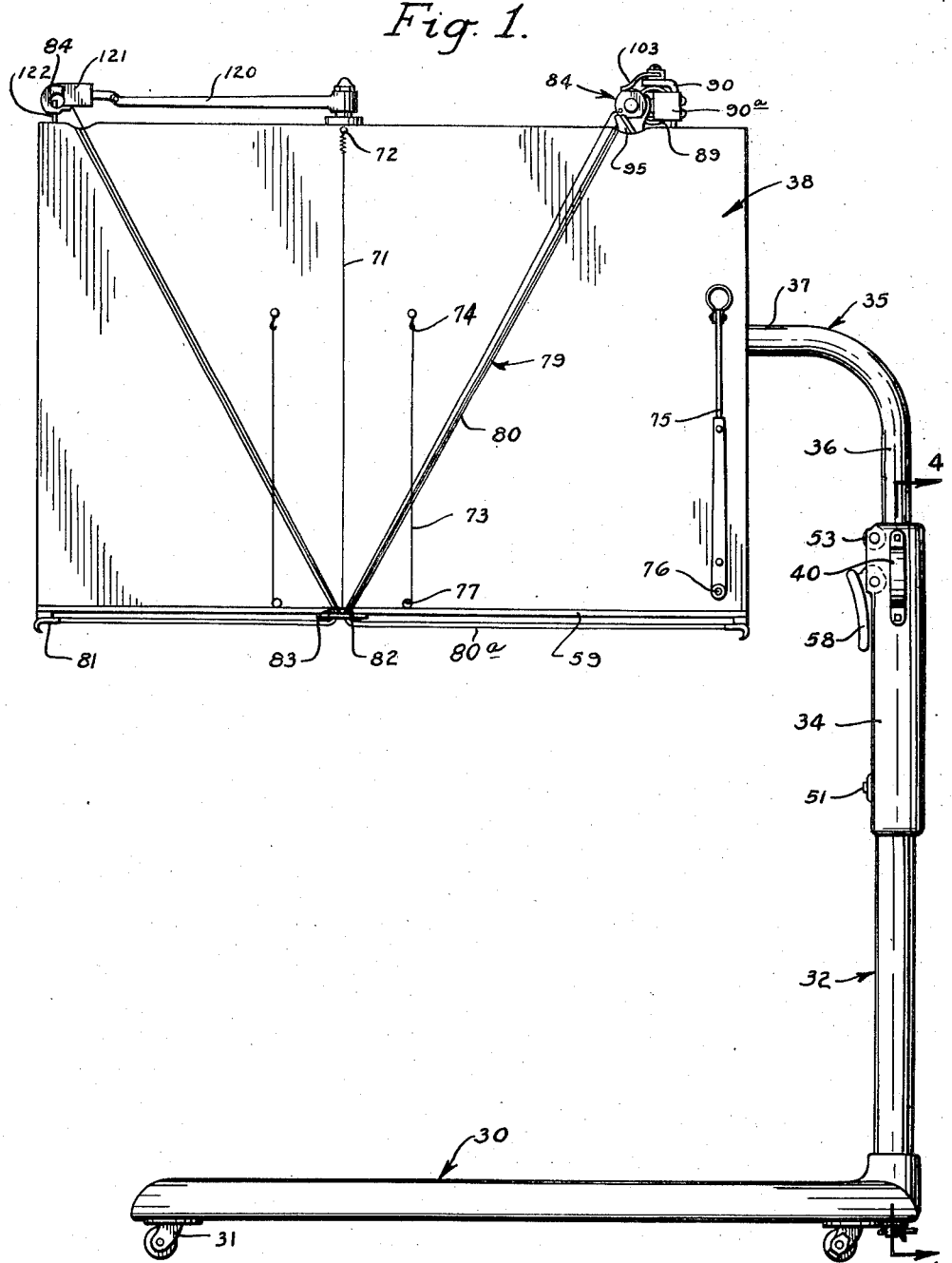

May 29, 1951 — T. C. DEMERS — 2,555,186
PAGE TURNER
Filed Jan. 21, 1948 — 5 Sheets-Sheet 1

INVENTOR.
T. C. DEMERS
BY
Kimmel & Crowell
ATTYS.

May 29, 1951  T. C. DEMERS  2,555,186
PAGE TURNER

Filed Jan. 21, 1948  5 Sheets-Sheet 2

INVENTOR.
T. C. DEMERS
BY
Kimmel & Crowell
ATTYS.

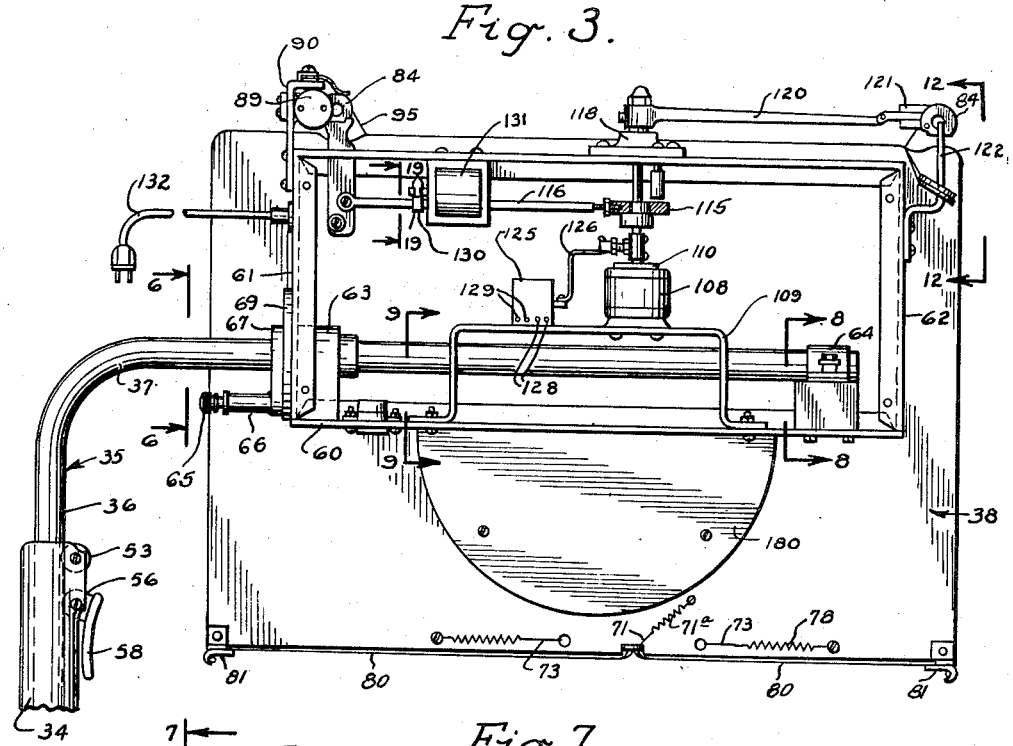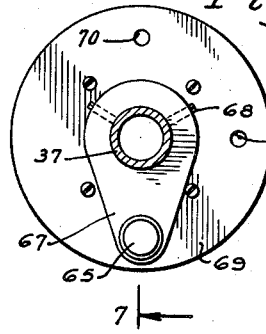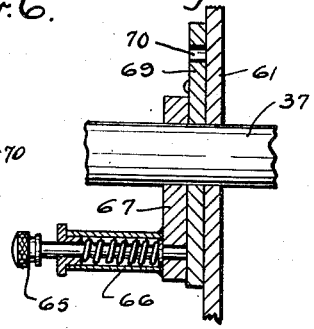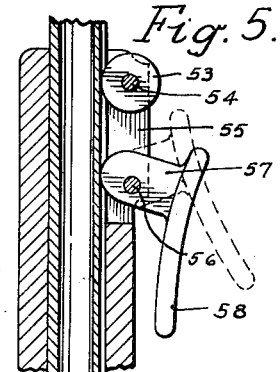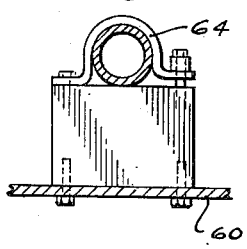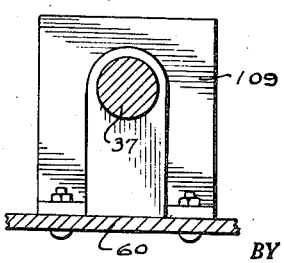
INVENTOR.
T. C. DEMERS
BY
Kimmel & Crowell
ATTYS.

May 29, 1951  T. C. DEMERS  2,555,186
PAGE TURNER
Filed Jan. 21, 1948  5 Sheets-Sheet 4
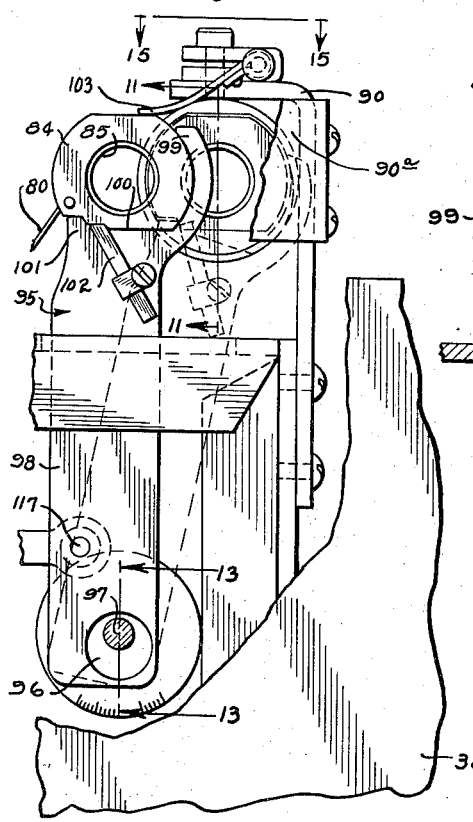
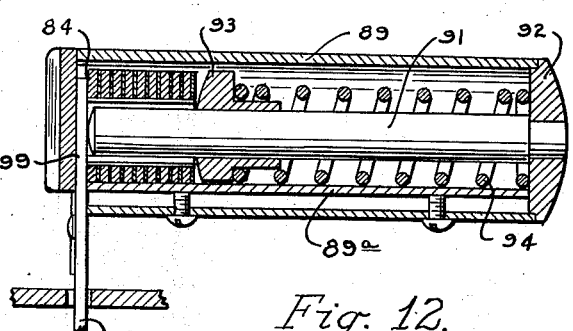
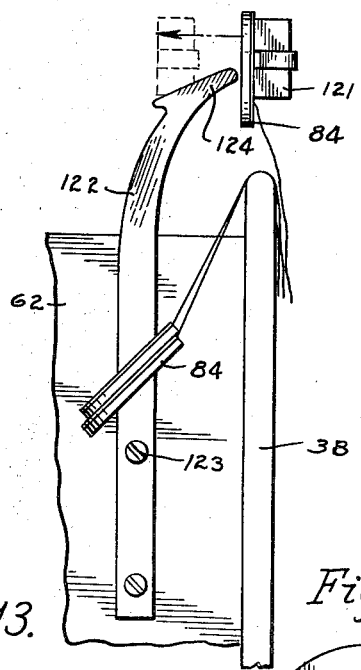
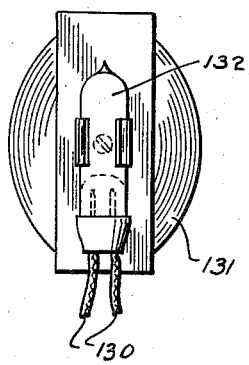
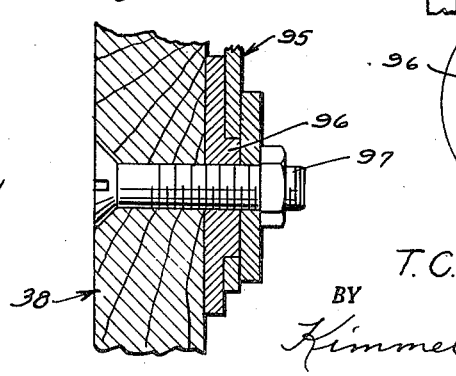
INVENTOR.
T. C. DEMERS
BY
Kimmel & Crowell
ATTYS.

May 29, 1951 — T. C. DEMERS — 2,555,186
PAGE TURNER
Filed Jan. 21, 1948 — 5 Sheets-Sheet 5
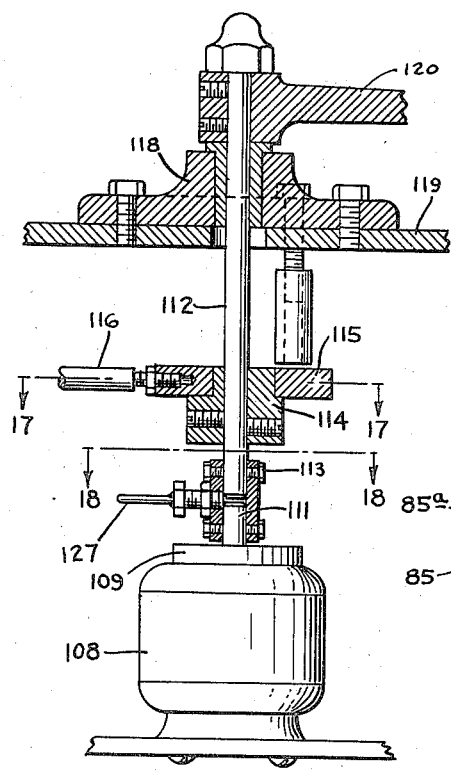
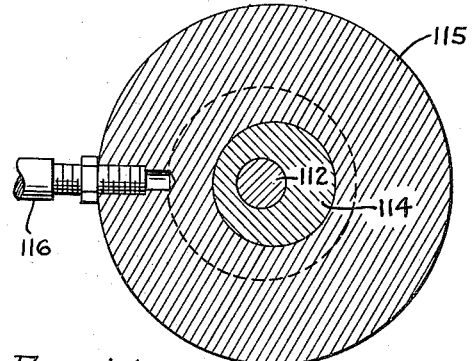
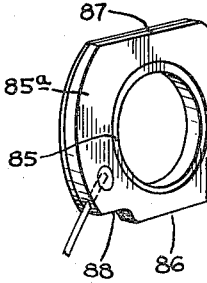
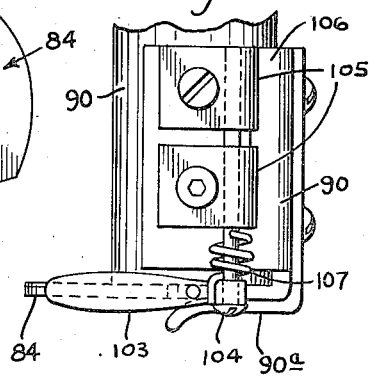
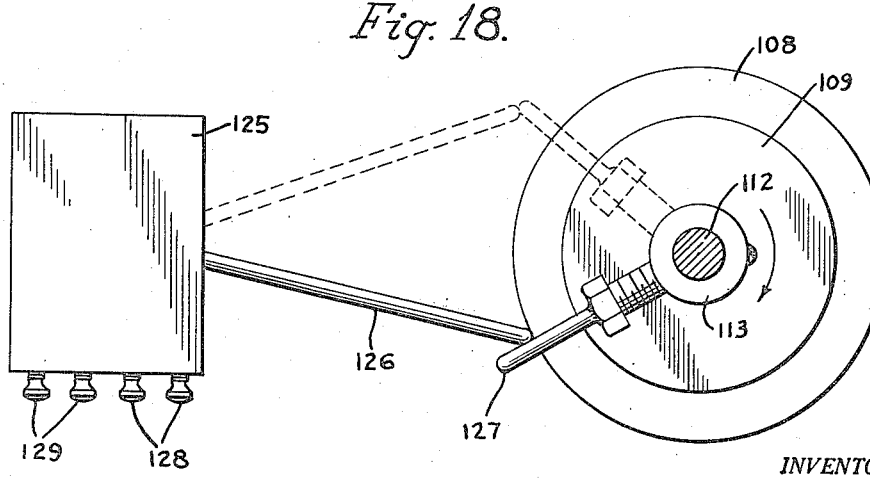
INVENTOR.
T. C. DEMERS
BY
Kimmel & Crowell
ATTYS.

Patented May 29, 1951

2,555,186

UNITED STATES PATENT OFFICE 2,555,186

PAGE TURNER

Telesphore C. Demers, Lebanon, N. H.

Application January 21, 1948, Serial No. 3,527

3 Claims. (Cl. 40—104)

This invention relates to page turning devices and is an improvement over my copending application Serial No. 621,287, filed October 9, 1945, for Universal Page Turner, now abandoned.

An object of this invention is to provide a page turning device for turning the pages of books, magazines or the like, the device being actuated by means of a remotely disposed operator which may be of a highly sensitive characteristic so that the device may be actuated by invalids having different degrees and kinds of physical incapacities.

Another object of this invention is to provide a device of this kind including an improved extensible standard or pedestal therefor.

A further object of this invention is to provide a device of this kind including an improved means for operating the page turning elements which includes magnetic pick-up means for said elements.

A further object of this invention is to provide a device of this kind wherein the book or folio holder may be tilted to any convenient position without affecting the operation of the device.

A further object of this invention is to provide a page turning device which is electrically operated and which automatically cuts off the electric motor after each page is turned, the cut-off being effected by means of a relay which is connected to a suitable switch operated by a patient or the like.

With the above and other objects in view, my invention consists in the arrangement, combination and details of construction disclosed in the drawings and specification, and then more particularly pointed out in the appended claims.

Figure 2:
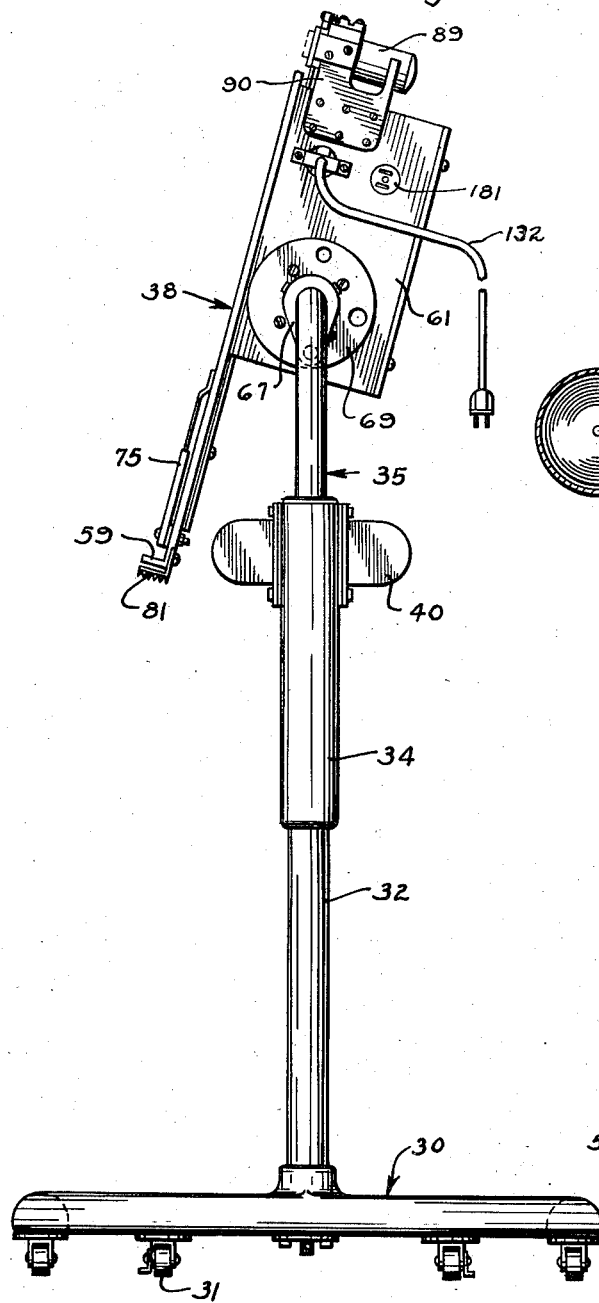
Figure 4:
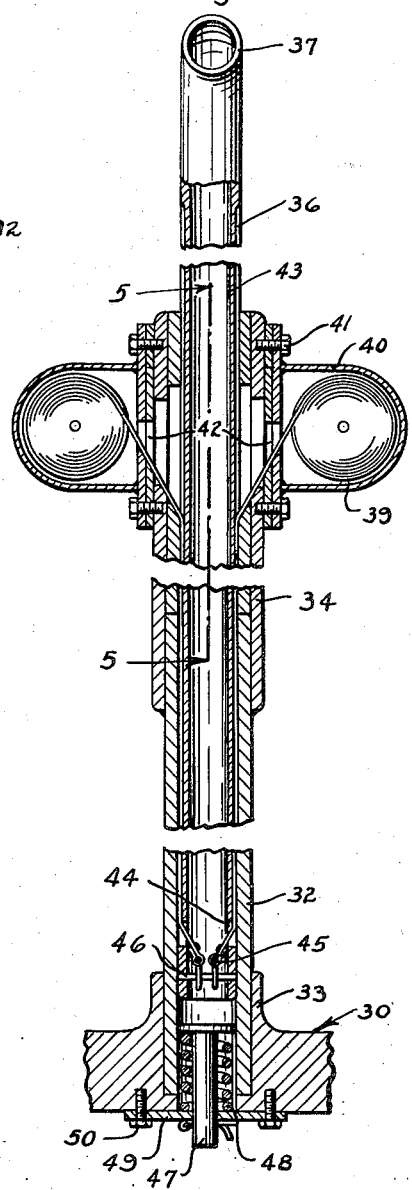

In the drawings,

Figure 1 is a detail front elevation of a page turning device constructed according to an embodiment of this invention, Figure 2 is a detail side elevation of the device, Figure 3 is a detail rear elevation of the upper portion of the device, Figure 4 is a fragmentary sectional view taken substantially on the line 4—4 of Figure 1, Figure 5 is a fragmentary sectional view taken substantially on the line 5—5 of Figure 4, Figure 6 is a fragmentary sectional view taken on the line 6—6 of Figure 3, Figure 7 is a sectional view taken on the line 7—7 of Figure 6, Figure 8 is a fragmentary sectional view taken on the line 8—8 of Figure 3, Figure 9 is a fragmentary sectional view taken on the line 9—9 of Figure 3, Figure 10 is a detail front elevation, partly broken away, showing the magazine and release means for the page turning elements, Figure 11 is a fragmentary sectional view taken on the line 11—11 of Figure 10, Figure 12 is a fragmentary end elevation taken substantially on the line 12—12 of Figure 3, Figure 13 is a fragmentary sectional view taken on the line 13—13 of Figure 10, Figure 13a is a front elevation of the cam bearing for the ejector, Figure 14 is a perspective view of one of the page turning elements, Figure 15 is a fragmentary plan view taken substantially on the line 15—15 of Figure 10, Figure 16 is a fragmentary vertical section, partly in elevation, of the operator for the page turning means, Figure 17 is a fragmentary sectional view taken on the line 17—17 of Figure 16, Figure 18 is a fragmentary sectional view taken on the line 18—18 of Figure 16, Figure 19 is a detail end elevation of the transformer associated with this device, taken substantially on the line 19—19 of Figure 3.

Referring to the drawings and first to Figures 1 to 19 inclusive, the numeral 30 designates generally a base which has rollers or wheels 31 on the lower side thereof. The base 30 at one end thereof has extending upwardly therefrom a tubular standard 32. The standard 32, as shown in Figure 4, extends into a boss 33 carried by the base 30, and the tubular member 32 has telescoping over the upper end thereof a tubular body 34.

An L-shaped extensible supporting arm 35 has a vertical side 36 telescoping into the tubular member 34, and the standard 32. The L-shaped member 35 includes a horizontal arm or side 37 on which a book supporting board generally designated as 38 is adapted to be adjustably mounted. The vertical arm 36 is substantially balanced by means of a pair of springs 39 which are disposed diametrically opposite each other, being rotatably mounted in the housing 40 secured by fastening means 41 to the upper portion of the tubular body 34.

The springs 39 have a free end extended through an opening 42 formed in the body 34 and this free end is then extended downwardly, engaging in a vertical channel 43 which is formed in the adjacent side of the vertical member 36. The spring is then extended downwardly in the channel 43 and is passed through an opening 44 formed in the lower end portion of the vertical arm 36 and is secured as indicated at 45 to a pin 46 engaging in a slot in the lower end of the arm 36.

A cushioning member or plunger 47 is slidable in the lower end of the standard 32, being spring-pressed upwardly by means of a spring 48 and a plate 49 is secured by fastening means 50 to the lower side of the base 30. The plunger 47 is provided so that sudden lowering of the vertical arm 36 will be cushioned at the lower end of the standard 32. As shown in Figure 5 a set screw 51 is threaded through the body 34 and engages in a vertically extending channel 52 which is formed in the arm 36 between the two channels 43, the set screw 51 constituting a stop for tube 36.

A roller 53 is rotatably carried by a shaft 54, extending between a pair of outwardly extending ears 55 carried by the body 34 and the roller 53 engages in the channel or keyway 52 so as to provide a substantially anti-friction means for assisting in vertical adjustment of the vertical arm 36 and to prevent turning of tube or arm 36. A cam-shaped locking member 56 is rockably carried by a pin 57 extending between the ears 55, and a handle 58 is fixed to the cam member 56 and provides a means whereby the vertical arm 36 may be locked in its vertically adjusted postiion.

The book supporting board 38 is provided at its lower edge with a forwardly extending flange 59 and is provided on the rear side thereof with a rearwardly extending plate 60 forming the base of a frame which is fixed to the rear side of the board 38. The plate or base 60 has extending upwardly from each end thereof vertical end plates 61 and 62 and the horizontal upper arm 37 extends through the end plate 61 and loosely engages in bearings 63 and 64 which are carried by the base 60. The board 38 is adapted to be releasably locked in adjusted angular position by means of a spring-pressed locking pin 65 carried by a housing 66 which is fixed to a plate 67. A bracket 67 is fixed by means of a set screw or other securing means 68 to the horizontal arm 37. The plate or end 61 has fixed thereto a plate 69 formed with a series of circumferentially spaced apart openings or keepers 70 in a selective one of which the spring-pressed locking pin 65 is adapted to engage.

A book is adapted to engage on the forward side of the board 38 and a holding cord or flexible member 71 engages through the center of the book and is attached at its upper end to a button 72 carried by the forward side of the board 38. The flexible member 71 is extended beneath the board 38, being secured to the back side of the board, and a spring 71a is interposed in the flexible member 71, being disposed on the back side of the board. The book is further secured to the board 38 by means of a pair of flexible holding members 73 which are adapted to engage those portions of the book on the opposite side of the holding cord 71 which are in back of the pages which are to be turned by the turning means to be hereinafter described. The cords 73 are secured to hooks or fastening means 74 carried by the forward side of the board 38. Where the book or magazine is of a relatively light weight or embodies a small number of pages, one side of the book is anchored to the forward side of the board 38 by means of a holding arm 75 which is pivotally secured as at 76 to the front side of the board 38. The arm 75 is preferably of yieldable and extensible characteristic so that it may be engaged with the book inwardly from the pages which are to be turned.

As shown in Figure 3, the holding members 73 are extended through openings 77 in the lower portion of the board 38 and are connected on the rear side of the board 38 to springs 78. In this manner the holding members 73 will yieldably hold the unused portions of the book against closing.

A plurality of page turning elements generally designated as 79 are adapted to be engaged one with each page or leaf of the book. Each page turning member 79 includes an elongated flexible elastic member 80 which has secured to its lower end a non-elastic cord 80a and the latter is anchored at its outer end to anchoring members 81 fixed to the opposite ends of the flange 59. The flexible members 80 are then extended inwardly toward the center of the board 38 and are then passed through slotted plates 82 fixed to the flange 59. The flexible members 80 are then extended through an opening 83 formed in the flange 59.

Each page turning member 80 is engaged on the rear side of a page or leaf and is then initially extended upwardly and to the right, as shown in Figure 1, to the upper edge of the board 38. The upper end of each flexible member 80 has fixed thereto a metal ring 84 which is formed with a central core 85 of ferrous characteristic with a non-magnetic outer part 85a and is provided with a flat lower side 86 and a flat upper side 87 as shown in Figure 14. Each ring 84 is also formed with a cut-out 88, the purpose for which will be hereinafter described.

The rings 84 are disposed in side-by-side relation within a magazine 89 which is fixed to a supporting arm or bracket 90 extending upwardly from the plate or end member 60. The magazine 89 has mounted therein an axially disposed pin 91 secured to an end member 92, and a spring-pressed plunger or ejector 93 is slidable in the magazine 89 and is constantly urged outwardly by means of a spring 94. The magazine 89 includes an inner guide plate 89a on which the flat surface 86 of each ring 84 slidingly engages. A ring ejecting member generally designated as 95 is rockably mounted on an eccentric pivot member 96 which is secured by fastening means 97 to the rear side of the board 38. The eccentric member 96 is provided so that the ejector 95 can be vertically adjusted to provide for the accurate ejection of the rings 84, one at a time.

The ejector 95 includes an elongated arm 98 which is formed at its upper end with an arcuate hook or finger 99 extending upwardly from a flat edge 100. The finger 99 works between the forward end of the magazine 89 and a guide 90a which is fixed to the bracket 90 and extends partly over the end of magazine 89. The arm 98 also includes a lug 101 which is adapted to engage in the cut-out 88 of a ring 84. A spring 102 is fixed to the upper portion of the arm 98 and is inclined, as shown in Figure 10, in the direction of the lug 101 so as to engage the inner portion of a ring 84 which is in ejecting position and is resting on the seat or flat surface 100 of the arm 98. The ejector 95 when in receiving position is in the dotted position shown in Figure 10, and at this time the foremost ring 84 which is urged forwardly by the spring-pressed plunger 93 will engage against the spring 102.

The lug 101 will also engage in a cut-out 88. When the ejector 95 is swung inwardly to ejecting position the arcuate arm 99 will push the foremost one of the rings 84 to the left as viewed in Figure 10, and in order to hold the ring 84 on the ejector 95 until the page turning arm or lever removes the ring 84 from the ejector I have provided a spring 103 which bears against the flat upper edge 87 of the ring 84. The spring 103 is loosely mounted on a pivot pin 104 carried by one or more bearings 105 which are fixed to the upper horizontal side 106 of the bracket 90. A coil spring 107 coacts with the spring or yieldable holding arm 103 in yieldably holding the ring 84 on the ejector until the ring is removed, as will be hereinafter described.

An electric motor 108 is mounted on a substantially U-shaped bracket 109 which is secured to the base member 60. The motor 108 includes a speed reduction means 110 of conventional construction whereby the shaft 111, extending from the speed reduction means 109 will rotate at the desired rate. A vertically disposed shaft 112 is disposed in alignment with the shaft 111, being connected thereto by means of a coupling 113. The shaft 112 has fixed thereto an eccentric 114 about which a ring 115 engages. The ring 115 constitutes the ejector operating member and has connected thereto a link 116 which is connected at the opposite end as at 117 to the ejector 95.

The shaft 112 extends through an upper bearing 118 which is carried by a top plate or frame member 119. The upper end of the shaft 118 has fixed thereto an elongated page turning arm or lever 120 and the arm or lever 120 has fixed to the outer end thereof a magnet 121. The magnet 121 is adapted to engage a ring 84 which is in ejected position and to carry this ring through an arc of 180°, across the front side of the board 38. When the ring, including the page turning member 80 is on the opposite portion of the board 38, the ring 84 which is magnetically carried by the magnet 121 will strike an upwardly and forwardly projecting releasing arm 122 which is secured by fastening means 123 to the rear side of the board 38.

The releasing arm 122 is curved upwardly and forwardly so that the bill portion 124 thereof will extend above the upper edge of the board 38 in a position to engage in the central hole 85 at the time the arm or lever 120 passes rearwardly from the forward side of the board 38. The bill 124 is disposed outwardly from the magnet 121 so that the arm or lever 120 can freely swing through a complete circle.

The rings 84 when released from the magnet 121 by engagement with the releasing member 122 then drop downwardly over the releasing member 122, as shown in Figure 12, with the flexible member 80 engaging over the upper edge of the board 38.

In order to provide for stopping of the motor 108 when the arm 120 makes substantially a complete revolution, I have provided a relay switch 125, having a switch operating arm 126 extending therefrom. The coupling 113 has secured thereto an outwardly projecting member 127 which is positioned to engage the L-shaped arm 126 and thereby move this arm to circuit breaking position. The relay 125 includes a pair of terminals 128 which are adapted to be connected to a source of electric current supply and also includes a second pair of terminals 129, at least one of the latter terminals being connected to the output side 130 of a transformer 131. The transformer 131 is provided so that a relatively low voltage electric current can be used with a switch connected to the terminals 129 and extended from the board 38 to a patient reposing in a bed or invalid chair.

In order to provide for breaking of the electric circuit to the transformer 131, I have provided a mercury circuit closer 132 which is adapted to normally maintain the transformer 131 in circuit with a supply conductor 132 when the board 38 is vertical. The board 38 may be swung to a substantially horizontal position for use as a table or tray and at this time the mercury switch 132 will be disposed in circuit breaking position so that the page turning mechanism cannot be accidentally operated with the board 38 in horizontal position. Switch 132 will also break the circuit when board 38 is inverted or reversed.

In the use and operation of this device, the base 30 is adapted to be disposed if desired partly beneath a bed or chair so that the board 38 will overlie the bed or the seat of a chair or the like. The board 38 is vertically adjusted by releasing the cam lever 58 and either raising or lowering the board supporting member 35. When motor 108 is operating, arm or lever 120 will swing to engage a ring 84 with magnet 121. As arm 120 swings toward the magazine 89, ejector 95 will be moved inwardly to ring ejecting position which is the solid line position shown in Figure 10.

The magnet 121 will strike the ejected ring 84 which is resiliently held on the ejector 95, and arm 120 will continue swinging forwardly through an arc of 180° from the right side of the board 38, as viewed in Figure 1, to the left side thereof.

As arm 120 swings forwardly the page turning member 80 will turn the page of the book or magazine associated therewith, and when arm 120 swings through a full arc of 180°, the ring 84 carried by the magnet 121 will strike the releasing member 122, engaging the bill 124 of releasing member 122. The cord 80 which is in engagement with a turning leaf will, at the upper end thereof, extend over the upper edge of the board 38 and as the ring 84 drops down over the bill 124 of releasing member 122, the turned page will be held in its turned position.

The operation of motor 108 is stopped after making one complete revolution of arm 120 by engagement of circuit breaking member 127 with arm 126 associated with relay 125. The board 38 may be swung to a horizontal position for use as a tray or table and if desired may be swung through an arc of 180° to dispose the back side thereof foremost. A mirror 180 which is disposed below the frame formed by the base 60, end walls 61 and 62 and top wall 119 is adapted to be disposed in the uppermost position upon rotation or adjustment of the board 38 through an arc of 180°.

An outlet fixture 181 is carried by end wall 61 and is connected to supply conductor so that electrically operated articles may be plugged into the supply line and operated independent of the operation of the page turner.

I do not mean to confine myself to the exact details of construction herein disclosed, but claim all variations falling within the purview of the appended claims.

What is claimed is:

1. A page turning device comprising a standard, a book supporting board carried by said standard, a plurality of flexible page turning elements secured at one end to the lower edge of said board, a metal member formed at least partially of para-magnetic material secured to the other end of each element, means supporting said members in side-by-side relation, a swinging arm carried by said board, an operator for said arm, a magnetic carrier fixed to said arm, an ejector operatively associated with said arm for ejecting a metal member from said supporting means to dispose said ejected metal member in the path of the swinging of said magnet whereby said metal member will adhere to said magnet for swinging therewith, and means for releasing said metal member from said magnet when said arm has swung through a page turning arc of substantially 180 degrees.

2. A page turning device comprising a standard, a book supporting board carried by said standard, a plurality of flexible page turning elements secured at one end to the lower edge of said board, a metal member formed at least partially of para-magnetic material secured to the other end of each element, means supporting said members in side-by-side relation, a rotating arm carried by said board, an electric operator for said arm, a magnetic carrier fixed to said arm, an ejector operatively associated with said arm for ejecting a metal member from said supporting means to dispose said ejected metal member in the path of the swinging of said magnet whereby said metal member will adhere to said magnet for swinging therewith, spring means releasably holding the foremost member in a position to be picked up by said magnet, means for releasing said metal member from said magnet when said arm has swung through a page turning arc of substantially 180 degrees, and automatically operable means for stopping said operator when said arm has completed a page turning cycle.

3. A page turning device comprising a standard, a book supporting board carried by said standard, a plurality of flexible page turning elements fixed to the lower portion of said board and extending upwardly on the forward side of said board, a metal member formed at least partially of para-magnetic material secured to the upper end of each element, a magazine carried by said board supporting said members in side-by-side relation, a swingable ejector disposed at the discharge end of said magazine for ejecting said members one at a time, an operating member carried by said board, a swinging arm connected with said operator, a magnet carried by said arm adapted to effect adherence of an ejected metal member thereto, means connecting said operator with said ejector, means fixed to said board and engageable with said metal members for disengaging the latter from said magnet, and means automatically stopping said operator at the completion of each page turning cycle.

TELESPHORE C. DEMERS.

REFERENCES CITED

The following references are of record in the file of this patent:

UNITED STATES PATENTS

| Number | Name | Date |
|---|---|---|
| 494,345 | Pearce | Mar. 28, 1893 |
| 516,008 | Gitchell | Mar. 6, 1894 |
| 641,484 | Wolff | Jan. 16, 1900 |
| 889,021 | Kerfoot | May 26, 1908 |
| 1,076,091 | Allen | Oct. 21, 1913 |
| 1,188,951 | Lacerda | June 27, 1916 |
| 1,543,599 | Chester | June 23, 1925 |
| 1,598,569 | Fitzhugh | Aug. 31, 1926 |
| 1,898,666 | Isaacson | Feb. 21, 1933 |
| 1,936,356 | Free | Nov. 21, 1933 |
| 2,070,542 | Brown | Feb. 9, 1937 |
| 2,192,296 | Boynton | Mar. 5, 1940 |
| 2,334,751 | Chapman | Nov. 23, 1943 |
| 2,367,441 | Schwinn | Jan. 16, 1945 |
| 2,411,084 | Demers | Nov. 12, 1946 |